(12) United States Patent
Chien

(10) Patent No.: US 9,775,016 B2
(45) Date of Patent: Sep. 26, 2017

(54) ELECTRONIC DEVICE AND METHOD FOR CALLING EMERGENCY CONTACT NUMBER

(71) Applicant: Chiun Mai Communication Systems, Inc., New Taipei (TW)

(72) Inventor: How-Wen Chien, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 79 days.

(21) Appl. No.: 14/609,705

(22) Filed: Jan. 30, 2015

(65) Prior Publication Data

US 2016/0066170 A1 Mar. 3, 2016

(30) Foreign Application Priority Data

Sep. 1, 2014 (CN) .......................... 2014 1 0440245

(51) Int. Cl.
*H04M 11/04* (2006.01)
*H04W 4/22* (2009.01)

(52) U.S. Cl.
CPC .................................... *H04W 4/22* (2013.01)

(58) Field of Classification Search
USPC ................ 455/404.1–404.2, 410–411, 412.2, 455/456.1–456.3, 457, 466
See application file for complete search history.

(56) References Cited

U.S. PATENT DOCUMENTS

| | | | |
|---|---|---|---|
| 8,219,028 B1* | 7/2012 | Flamholz | G06F 1/1694 455/41.2 |
| 8,929,854 B2* | 1/2015 | Ung | H04W 4/14 455/404.2 |
| 2004/0266390 A1* | 12/2004 | Faucher | G08B 21/0211 455/404.1 |
| 2005/0049897 A1* | 3/2005 | Kameda | G06F 19/322 705/2 |
| 2006/0142057 A1* | 6/2006 | Schuler | G06F 19/323 455/556.1 |
| 2007/0265032 A1* | 11/2007 | Aisenberg | H04M 1/0279 455/556.1 |
| 2010/0190468 A1* | 7/2010 | Scott | H04M 1/2745 455/404.2 |
| 2011/0143705 A1* | 6/2011 | Ogram | G06F 19/3418 455/404.1 |
| 2012/0302198 A1* | 11/2012 | Ku | H04W 4/028 455/404.2 |
| 2013/0190674 A1* | 7/2013 | Case | A61M 5/1723 604/6.01 |
| 2014/0108048 A1* | 4/2014 | Cohn | G06Q 50/24 705/3 |

(Continued)

*Primary Examiner* — Dai A Phuong
(74) *Attorney, Agent, or Firm* — Steven Reiss

(57) ABSTRACT

A method for safeguarding the health of a user using an electronic device includes the electronic device calling at least one emergency contact number with pre-stored medical information of the user and at least one emergency contact number stored in a storage device of the electronic device. When a command inputted by the user is received, medical information relevant to the user is broadcast and is also displayed on a display of the electronic device. A message including current location of the user and the medical information is sent to the at least one emergency contact number, and a phone call is dialed to the at least one emergency contact number.

18 Claims, 4 Drawing Sheets

(56) References Cited

U.S. PATENT DOCUMENTS

2015/0373091 A1* 12/2015 Sanghavi .............. H04W 4/206
                                                      709/204
2016/0006760 A1* 1/2016 Lala .................... H04L 63/1483
                                                      726/23

* cited by examiner

ELECTRONIC DEVICE AND METHOD FOR CALLING EMERGENCY CONTACT NUMBER

CROSS-REFERENCE TO RELATED APPLICATIONS

This application claims priority to Chinese Patent Application No. 201410440245.6 filed on Sep. 1, 2014, the contents of which are incorporated by reference herein.

FIELD

The subject matter herein generally relates to emergency communications.

BACKGROUND

An electronic device (e.g., a mobile phone) can be used to call one or more emergency contact numbers. It is necessary for a user of the electronic device to dial a phone call to a pre-stored emergency contact number when the user is in danger.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
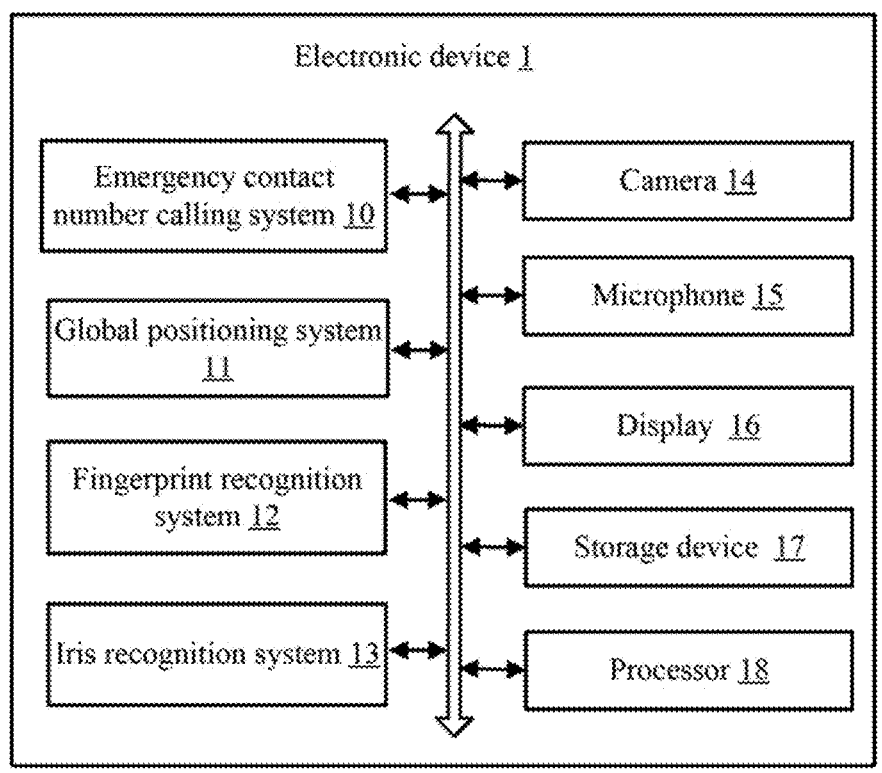
FIG. 1 is a block diagram of an example embodiment of an electronic device including an emergency contact number calling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of an electronic device including an emergency contact number calling system. In at least one embodiment, an electronic device 1 includes an emergency contact number calling system 10. The electronic device 1 can be a smart phone, a personal digital assistant (PDA), a tablet computer, or other electronic device. The electronic device 1 further includes, but is not limited to, a global positioning system (GPS) 11, a fingerprint recognition system 12, an iris recognition system 13, a camera 14, a microphone 15, a display 16, a storage device 17, and at least one processor 18. FIG. 1 illustrates only one example of the electronic device, other examples can include more or fewer components than as illustrated, or have a different configuration of the various components in other embodiments.

In at least one embodiment, the storage device 17 can include various types of non-transitory computer-readable storage mediums. For example, the storage device 17 can be an internal storage system, such as a flash memory, a random access memory (RAM) for temporary storage of information, and/or a read-only memory (ROM) for permanent storage of information. The storage device 17 can also be an external storage system, such as a hard disk, a storage card, or a data storage medium. The at least one processor 18 can be a central processing unit (CPU), a microprocessor, or other data processor chip that performs functions of the electronic device 1.

The emergency contact number calling system 10 can broadcast medical information and display the medical information on the display 16 when a predetermined command is received, send a message including current location information of the user and the medical information to at least one emergency contact number, and dial a phone call to the at least one emergency contact number according to the predetermined command. For example, when the user needs help, the user can input the predetermined command to trigger the emergency contact number calling system 10.

The GPS 11 can acquire current location information of the electronic device 1, the fingerprint recognition system 12 can recognize fingerprints and palm prints of the user, the iris recognition system 13 can recognize characteristics of the irises of the eyes of a user in images of the user, the camera 14 can capture facial images of the user, the microphone 15 can acquire voice of the user, the display 16 can display symptoms of diseases and emergency relief operations of the medical information of the user.

Figure 2:
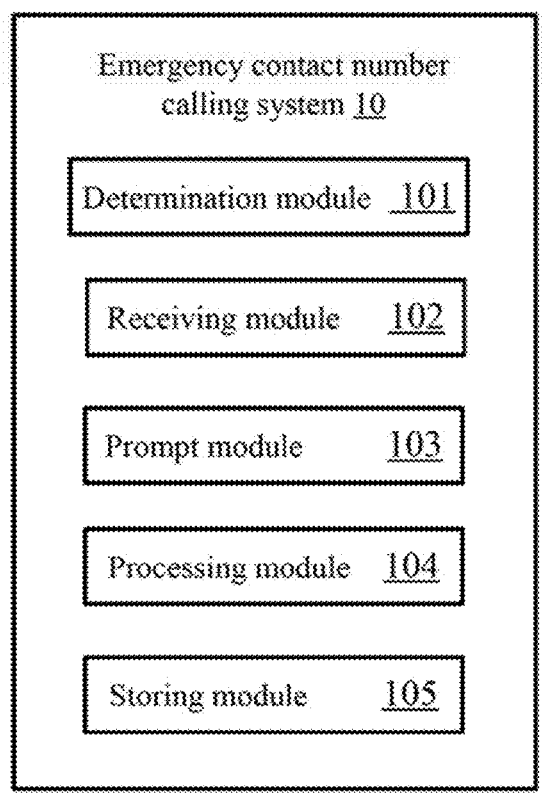
FIG. 2 is a block diagram of an example embodiment of function modules of the emergency contact number calling system in the electronic device of FIG. 1.

FIG. 2 is a block diagram of one embodiment of function modules of the emergency contact number calling system. In at least one embodiment, the emergency contact number calling system 10 can include a determination module 101, a receiving module 102, a prompt module 103, a processing module 104, and a storing module 105. The function modules 101, 102, 103, 104, and 105 can include computerized codes in the form of one or more programs which are stored in the storage device 17. The at least one processor 18 executes the computerized codes to provide functions of the function modules 101-105.

The determination module 101 determines whether private information of the user is published. In at least one embodiment, the determination module 101 can provide a user interface on the display 16 for the user to choose whether the private information is allowed to be published. In at least one embodiment, the private information may include, but is not limited to, a past illness of the user or a disorder to which the user is susceptible, and at least one emergency contact number.

Figure 4:
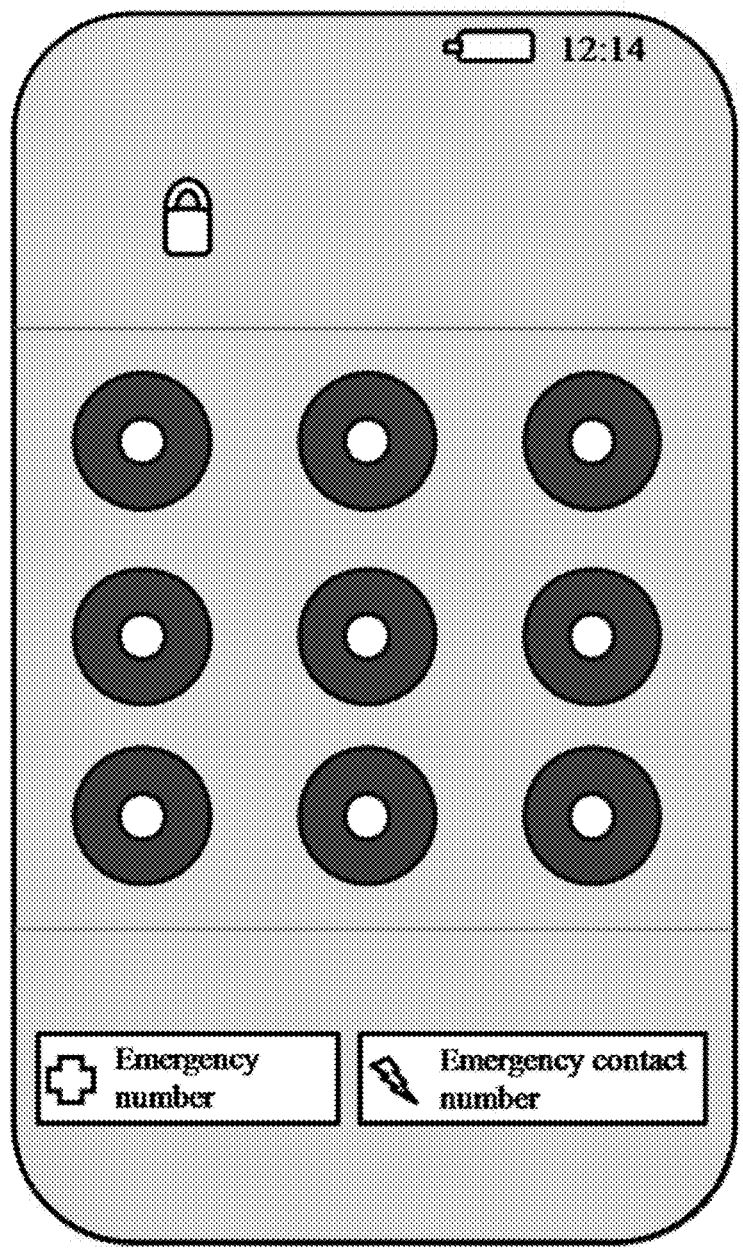
FIG. 4 is a diagrammatic view of an example embodiment of a function button of the electronic device of FIG. 1.

The receiving module 102 receives a command inputted by the user. In at least one embodiment, the receiving module 102 provides a predetermined function button for the user to issue the command. For example, as shown in FIG. 4, the predetermined function button can be an icon. The predetermined function button can be displayed on the display 16 to be pressed by the user whether or not the electronic device 1 is locked. That is, even when the electronic device 1 is locked, the predetermined function button can be displayed on the display 16.

The prompt module 103 broadcasts medical information of the user and displays the medical information on the display 16 of the electronic device 1 when the private information of the user is allowed to be published. The prompt module 103 can broadcast the medical information of the user using information orally input by the user or other sounds recorded by the microphone 15.

In at least one embodiment, the medical information can be pre-stored in the storage device 17. The medical information may include, but is not limited to, clinical symptoms of diseases possibly applying to the user and relief operations which are specific to the user. For example, the clinical symptoms of a user's hypoglycemia may include hunger, sweating, shakiness, palpitations, dizziness, nausea and/or a headache. The emergency relief operations corresponding to the hypoglycemia may include sugar or sugary beverages to be administered to the user. For example, when the user becomes seriously hypoglycemic and delirious, a passers-by may be given the medical information of the user, and execute emergency relief operations to help the user, such as feeding some sugar or sugary beverages to the user according to the medical information, to help the user.

The processing module 104 sends a message including current location information of the user and the medical information to at least one emergency contact number, and dials a phone call to the at least one emergency contact number according to the command. In at least one embodiment, the at least one emergency contact number can be pre-stored in the storage device 17. For example, one of the at least one emergency contact number is a phone number of a personal doctor. The processing module 104 acquires the current position of the user from the GPS 11.

The storing module 105 stores predetermined authentication information into the storage device 17 when the private information of the user is not allowed to be published. In at least one embodiment, the predetermined authentication information includes fingerprint data, palm prints, facial images, voice characteristics, and/or iris characteristics.

In at least one embodiment, the storing module 105 uses the fingerprint recognition system 12 to gather the fingerprints data and palm prints of the user, acquires images of multi-perspective views of the face of the user and images of the iris of the user by the camera 14 of the electronic device 1. The storing module 105 stores the iris characteristics which can be recognized from the images of iris, and stores the voice characteristics of the user extracted from voice of the user which using the microphone 15.

The receiving module 102 further receives the authentication information inputted by the user when the private information of the user is not allowed to be published. In at least one embodiment, the receiving module 102 can provide a user interface on the display 16 for the user to input the authentication information. For example, the receiving module 102 can obtain the fingerprint data and the palm prints of the user through the user interface. The receiving module 102 can further obtain the facial images and/or the iris images from the camera 14. The iris recognition system 13 can recognize iris characteristics of the user from the facial images or from the iris images. The receiving module 102 can obtain the sounds of the voice of the user using the microphone 15, and the voice characteristics of the user can be extracted.

The determination module 101 further determines whether the received authentication information is the same as the predetermined authentication information when the private information of the user is not allowed to be published. When the received authentication information is the same as the predetermined authentication information, the processing module 104 sends a message including current position information of the user and the medical information to at least one emergency contact number, and dials a phone call to the at least one emergency contact number according to the command. When the received authentication information is different from the predetermined authentication information, the receiving module 102 receives the authentication information inputted by the user.

Figure 3:
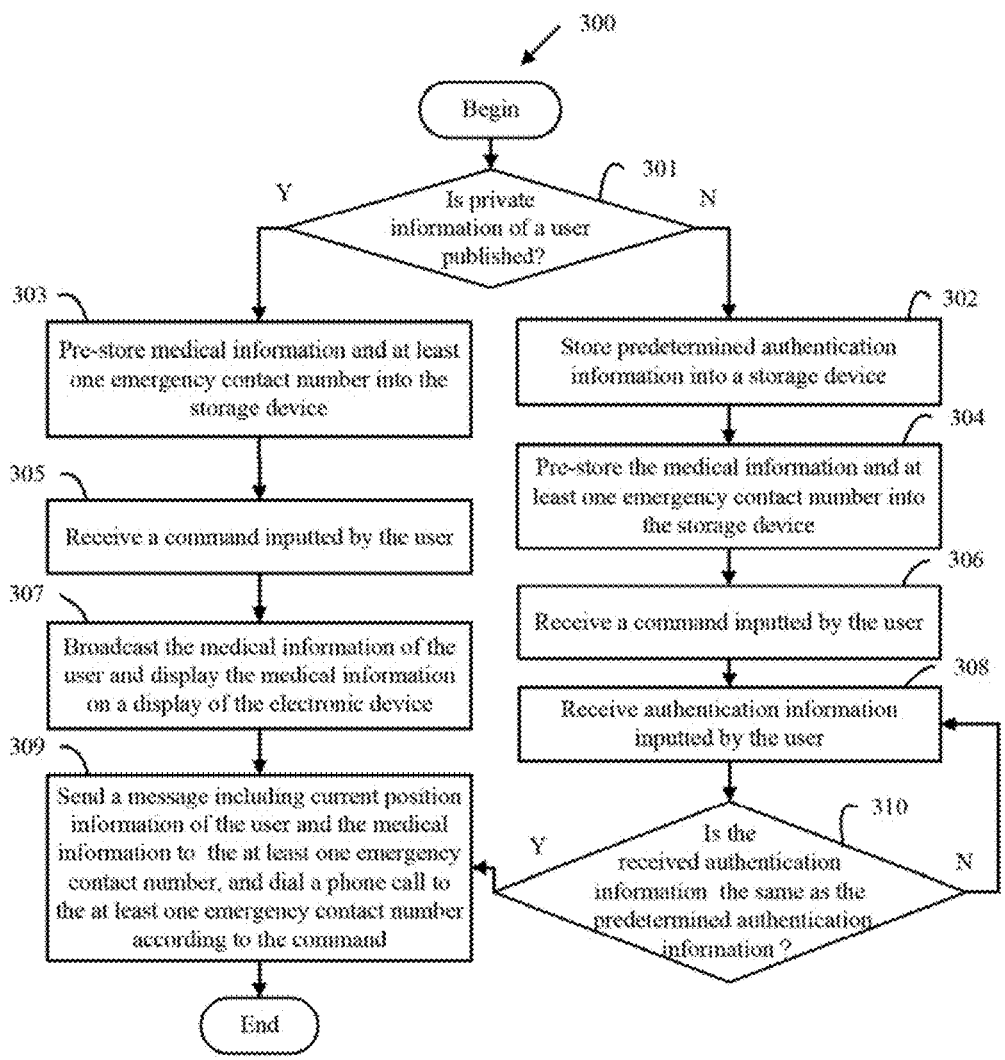
FIG. 3 is a flowchart of an example embodiment of an emergency contact number calling method using the electronic device of FIG. 1.

FIG. 3 illustrates a flowchart of an example embodiment of a method 300 for calling an emergency contact number using the electronic device of FIG. 1. In at least one embodiment, the method 300 is provided by way of example, as there are a variety of ways to carry out the method 300. The method 300 described below can be carried out using the configurations illustrated in FIG. 1, for example, and various elements of these figures are referenced in explaining example method. Each block shown in FIG. 3 represents one or more processes, methods, or subroutines, carried out in the exemplary method. Furthermore, the illustrated order of blocks is by example only and the order of the blocks can change. The exemplary method can begin at block 301. Depending on the embodiment, additional steps can be added, others removed, and the ordering of the steps can be changed.

At block 301, a determination module determines whether private information of the user is to be published. When the private information of the user is not to be published, the procedure goes to block 302. When the private information of the user is to be published, the procedure goes to block 303. In at least one embodiment, the determination module can provide a user interface on the display for the user to select publishing or non-publishing of the private information.

At block 302, a storing module stores predetermined authentication information into the storage device. In at least one embodiment, the predetermined authentication information includes fingerprint data, palm prints, facial images, voice characteristics, and/or iris characteristics.

At block 304, the storing module pre-stores medical information relevant to a user and at least one emergency contact number into the storage device. In at least one embodiment, the at least one emergency contact number may be a phone number of a personal doctor. The medical information may include, but is not limited to, clinical symptoms of diseases and emergency relief operations. For example, the clinical symptoms of hypoglycemia in a user may include hunger, sweating, shakiness, palpitation, dizziness, nausea and/or a headache. The emergency relief operations corresponding to the hypoglycemia may include feeding some sugar or sugary beverages to the user. For example, when the user becomes seriously hypoglycemic and delirious, a passer-by may be allowed to see medical information of the user, and can execute emergency relief operations to help the user, such as feeding some sugar or sugary beverages to the user according to the medical information seen.

At block 306, a receiving module receives a command inputted by the user. In at least one embodiment, the receiving module provides a predetermined function button for the user to send the command. The predetermined function button can be displayed on the display to be pressed by the user whether or not the electronic device is locked. That is, even when the electronic device is locked, the predetermined function button also can be displayed on the display.

At block 308, the receiving module receives the authentication information inputted by the user. For example, the receiving module can receive the fingerprint data and the palm prints of the user through the user interface. The receiving module can further receive the facial images and/or the iris images from the camera. The iris recognition system can recognize iris characteristics of the user from the facial images or from the iris images. The receiving module can receive sounds of voice of the user using the microphone, and the voice characteristics of the user can be extracted.

At block 310, the determination module determines whether the received authentication information is the same as the predetermined authentication information. When the received authentication information is the same as the predetermined authentication information, the procedure goes to block 309. When the received authentication information is different from the predetermined authentication information, the procedure returns to block 308.

At block 303, the storing module pre-stores medical information and at least one emergency contact number into the storage device.

At block 305, the receiving module receives a command inputted by the user.

At block 307, a prompt module broadcasts medical information of the user and displays the medical information on the display of the electronic device. The prompt module can broadcast the medical information of the user using a loudspeaker of the electronic device.

At block 309, a processing module sends a message including current location information of the user and the medical information to at least one emergency contact number, and dials a phone call to the at least one emergency contact number according to the command. The processing module acquires the current location information from the GPS.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device, comprising:
   a display;
   a processor; and
   a storage device configured to store medical information of a user and at least one emergency contact number, the storage device further configured to store one or more programs which, when executed by the processor, cause the processor to:
   provide a user interface on the display for the user to select publishing or non-publishing of private information of the user, wherein the private information comprises a past illness of the user or a disorder to which the user is susceptible;
   broadcast the medical information and display the medical information on the display of the electronic device when the publishing of the private information is selected by the user, and neither broadcast nor display the medical information when the non-publishing of the private information is selected by the user;
   store predetermined authentication information into the storage device and receive authentication information inputted by the user when the non-publishing of the private information is selected by the user; and
   send a message comprising current position information of the user and the medical information to the at least one emergency contact number when the publishing of the private information is selected by the user or the received authentication information is the same as the predetermined authentication information, wherein the message is not sent when the non-publishing of the private information is selected by the user and the received authentication information is not the same as the predetermined authentication information.

2. The electronic device according to claim 1, wherein the processor further:
   receives authentication information inputted by the user; and
   sends the message comprising the current position information of the user and the medical information to the at least one emergency contact number and dials a phone call to the at least one emergency contact number according to the command when the received authentication information is the same as the predetermined authentication information.

3. The electronic device according to claim 2, wherein the processor further:
   dials a phone call to the at least one emergency contact number when a predetermined function button on the display is pressed.

4. The electronic device according to claim 3, wherein the predetermined function button is displayed on the display to be pressed by the user when the electronic device is locked.

5. The electronic device according to claim 2, wherein the predetermined authentication information comprises at least one of fingerprint data, palm prints, facial images, voice characteristics and iris characteristics.

6. The electronic device according to claim 1, wherein the medical information comprises clinical symptoms of diseases and emergency relief operations.

7. A computer-implemented method comprising:
   storing medical information of a user and at least one emergency contact number;

providing a user interface on a display of an electronic device for the user to select publishing or non-publishing of private information of the user, wherein the private information comprises a past illness of the user or a disorder to which the user is susceptible;

broadcasting the medical information and displaying the medical information on the display when the publishing of the private information is selected by the user, and neither broadcast nor display the medical information when the non-publishing of the private information is selected by the user;

store predetermined authentication information into the storage device and receive authentication information inputted by the user when the non-publishing of the private information is selected by the user; and sending a message comprising current position information of the user and the medical information to the at least one emergency contact number when the publishing of the private information is selected by the user or the received authentication information is the same as the predetermined authentication information, wherein the message is not sent when the non-publishing of the private information is selected by the user and the received authentication information is not the same as the predetermined authentication information.

8. The method according to claim 7, further comprising:
receiving authentication information inputted by the user; and sending the message comprising the current position information of the user and the medical information to the at least one emergency contact number and dialing a phone call to the at least one emergency contact number according to the command when the received authentication information is the same as the predetermined authentication information.

9. The method according to claim 8, further comprising:
dialing a phone call to the at least one emergency contact number when a predetermined function button on the display is pressed.

10. The method according to claim 9, wherein the predetermined function button is displayed on the display to be pressed by the user when the electronic device is locked.

11. The method according to claim 8, wherein the predetermined authentication information comprises at least one of fingerprint data, palm prints, facial images, voice characteristics and iris characteristics.

12. The method according to claim 7, wherein the medical information comprises clinical symptoms of diseases and emergency relief operations.

13. A non-transitory storage medium having stored thereon instructions that, when executed by a processor of an electronic device, causes the processor to perform a method, the method comprising:
storing medical information of a user and at least one emergency contact number;

providing a user interface on a display of an electronic device for the user to select publishing or non-publishing of private information of the user, wherein the private information comprises a past illness of the user or a disorder to which the user is susceptible;

broadcasting the medical information and displaying the medical information on a display of the electronic device when the publishing of the private information is selected by the user, and neither broadcast nor display the medical information when the non-publishing of the private information is selected by the user;

store predetermined authentication information into the storage device and receive authentication information inputted by the user when the non-publishing of the private information is selected by the user; and sending a message comprising current position information of the user and the medical information to the at least one emergency contact number when the publishing of the private information is selected by the user or the received authentication information is the same as the predetermined authentication information, wherein the message is not sent when the non-publishing of the private information is selected by the user and the received authentication information is not the same as the predetermined authentication information.

14. The non-transitory storage medium according to claim 13, wherein the method further comprises:
receiving authentication information inputted by the user; and sending the message comprising the current position information of the user and the medical information to the at least one emergency contact number and dialing a phone call to the at least one emergency contact number according to the command when the received authentication information is the same as the predetermined authentication information.

15. The non-transitory storage medium according to claim 13, wherein the method further comprises:
dialing a phone call to the at least one emergency contact number when a predetermined function button on the display is pressed.

16. The non-transitory storage medium according to claim 15, wherein the predetermined function button is displayed on the display to be pressed by the user when the electronic device is locked.

17. The non-transitory storage medium according to claim 14, wherein the predetermined authentication information comprises at least one of fingerprint data, palm prints, facial images, voice characteristics and iris characteristics.

18. The non-transitory storage medium according to claim 13, wherein the medical information comprises clinical symptoms of diseases and emergency relief operations.

* * * * *